US006960139B2

(12) United States Patent
Garcia

(10) Patent No.: US 6,960,139 B2
(45) Date of Patent: Nov. 1, 2005

(54) BEARINGS SLIP JOINT

(75) Inventor: Jesus Raul Garcia, Juarez (MX)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/613,337

(22) Filed: Jul. 3, 2003

(65) Prior Publication Data

US 2004/0048677 A1 Mar. 11, 2004

Related U.S. Application Data

(63) Continuation of application No. 10/242,347, filed on Sep. 11, 2002, now abandoned.

(51) Int. Cl.[7] ............................. F16D 3/06; F16C 3/035
(52) U.S. Cl. ....................................... 464/167; 464/905
(58) Field of Search ................................ 464/167, 162, 464/905, 111, 112, 115, 119, 120, 122, 123; 74/492

(56) References Cited

U.S. PATENT DOCUMENTS

| 2,284,199 | A | | 5/1942 | Greiner |
| 3,120,744 | A | | 2/1964 | Dunn |
| 3,434,369 | A | | 3/1969 | Runkle |
| 4,504,245 | A | | 3/1985 | Orain |
| 5,115,691 | A | | 5/1992 | Beauch |
| 6,120,381 | A | * | 9/2000 | Orain et al. ................. 464/123 |

* cited by examiner

Primary Examiner—David Bagnell
Assistant Examiner—K. Thompson
(74) Attorney, Agent, or Firm—Michael D. Smith

(57) ABSTRACT

A shaft assembly having an inner shaft extending lengthwise within an outer shaft, and a slip joint enabling relative axial movement between the shafts. The slip joint includes roller tracks on the outer shaft, and rollers on the inner shaft in rolling engagement with the roller tracks.

3 Claims, 2 Drawing Sheets

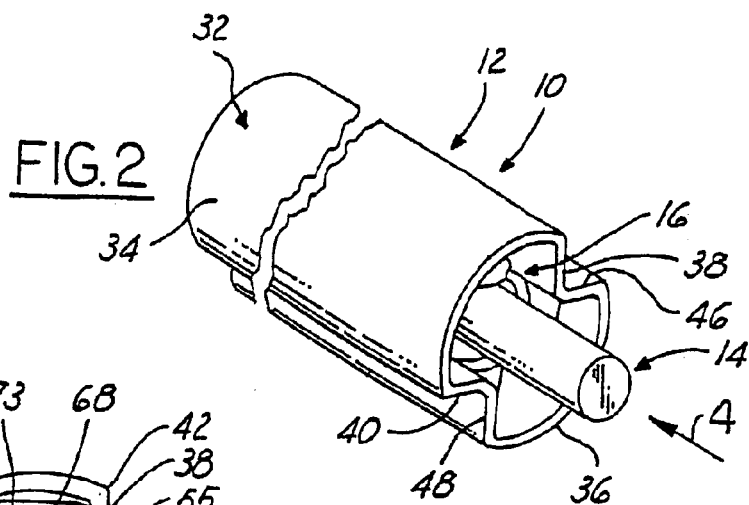
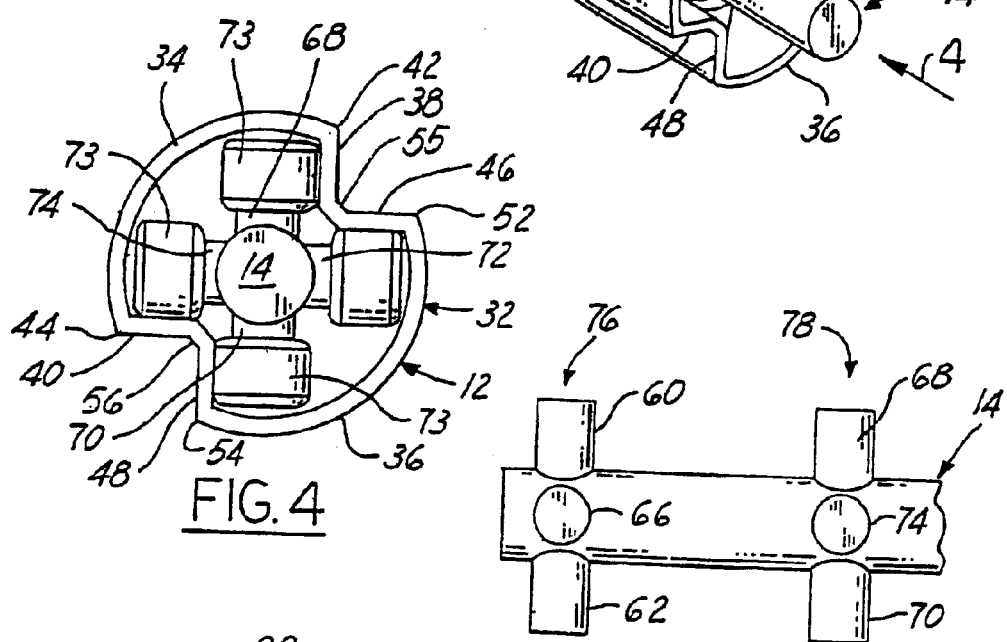
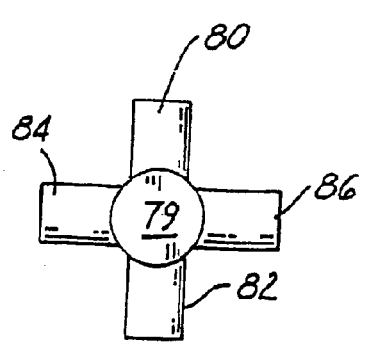
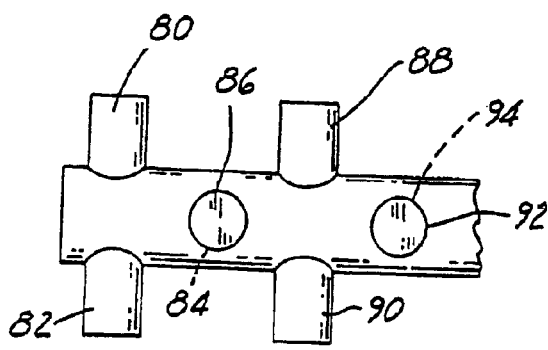

US 6,960,139 B2

BEARINGS SLIP JOINT

This application is a continuation of application Ser. No. 10/242,347 filed Sep. 11, 2002 now abandoned.

BACKGROUND OF THE INVENTION

1. Technical Field

This invention relates generally to shaft assemblies and more particularly to a shaft assembly having an inner shaft movable axially within an outer shaft.

2. Related Art

Shaft assemblies including relatively axially movable inner and outer shafts have many different functions, one being the transmission of torque. A slip joint is usually provided between the shafts to facilitate relative axial movement.

One requirement of the joint is that its resistance to relative axial shaft movement, commonly referred to as "slip load", be kept to a minimum so that the shafts may be put together easily at the point of manufacture to speed up production without raising ergonomic concerns. A low slip load is also particularly important if the shaft assembly transmits torque, as it is required to do when used with the steering column of an automotive vehicle.

Customers are demanding lower and lower slip loads. However, it has been difficult to meet these demands with designs currently available.

SUMMARY OF THE INVENTION

In accordance with the present invention, a slip joint is provided between an inner shaft and an outer shaft, the slip joint comprising roller tracks on the outer shaft, and rollers on the inner shaft which have a rolling engagement with the tracks. Preferably the rollers are mounted on the inner shaft by pins projecting radially outwardly from the inner shaft. The pins are preferably arranged in pairs with the pins of each pair projecting radially outwardly in opposite directions on a common center line. Each pair of pins may be arranged in the same transverse plane as another pair of pins, or the pin pairs may be distributed in spaced apart relation axially along the length of the shaft. Preferably the rollers are mounted on the pins by needle bearings.

The shaft assembly of this invention has low slip load even at high levels of torque, and will develop zero, or near zero, lash and deflection in use. The phenomenon of slip-stick, common in many prior relatively axially movable shaft assemblies, is reduced, if not eliminated, in the shaft assembly of the present invention. Slip-stick is the tendency of one shaft to in effect stick relative to the other shaft, requiring increased axial loading before movement will commence.

BRIEF DESCRIPTION OF THE DRAWINGS

The foregoing as well as other features, objects and advantages of this invention will become more apparent as the following description proceeds, especially when considered with the accompanying drawings, wherein:

FIG. 2 is a side elevational view of the shaft assembly, with parts broken away;

FIG. 4 is a view taken in the direction of the arrow 4 in FIG. 2;

FIG. 5 is an elevational view of the inner shaft, with the rollers removed;

FIG. 6 is a view similar to FIG. 5, showing a modification of the inner shaft; and FIG. 7 is an end view of the inner shaft shown in FIG. 6.

BRIEF DESCRIPTION OF THE PREFERRED EMBODIMENTS

Referring now more particularly to the drawings, there is shown in FIG. 2 a shaft assembly 10 including an elongated open-ended tubular outer shaft 12 and an elongated inner shaft 14 extending lengthwise within the outer shaft 12, with the longitudinal center line of the inner shaft coincident with that of the outer shaft. A slip joint 16 between the shafts enables relative axial shaft movement.

Figure 1:
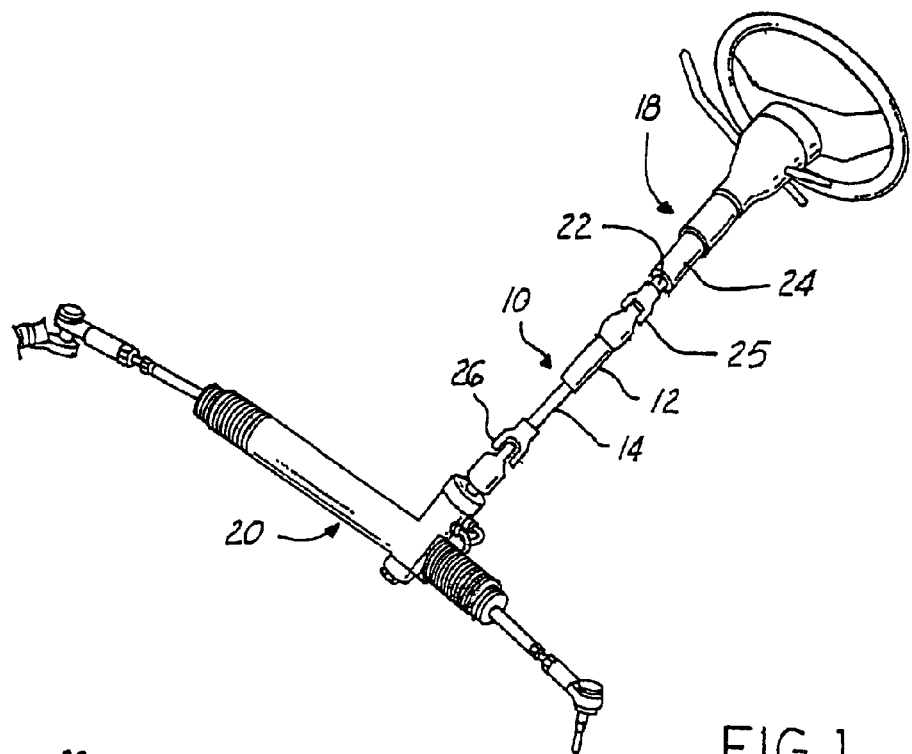
FIG. 1 is a perspective view, showing the shaft assembly of this invention connecting a steering column to a steering gear of an automotive vehicle.

FIG. 1 shows the shaft assembly 10 between a steering column 18 and a steering gear 20 of an automotive vehicle. In this environment, the assembly 10 is sometimes referred to as an intermediate shaft. The steering column 18 has a steering shaft 22 supported for rotation and axial movement within a tubular jacket 24. The front end of the steering shaft 22 is connected to the rear end of the outer shaft 12 by a universal joint 25, and the front end of the inner shaft 14 is connected to the steering gear 20 by a universal joint 26. The shaft assembly 10 as used in FIG. 1 adjusts for misalignment between the steering column 18 and the steering gear 20.

Figure 3:
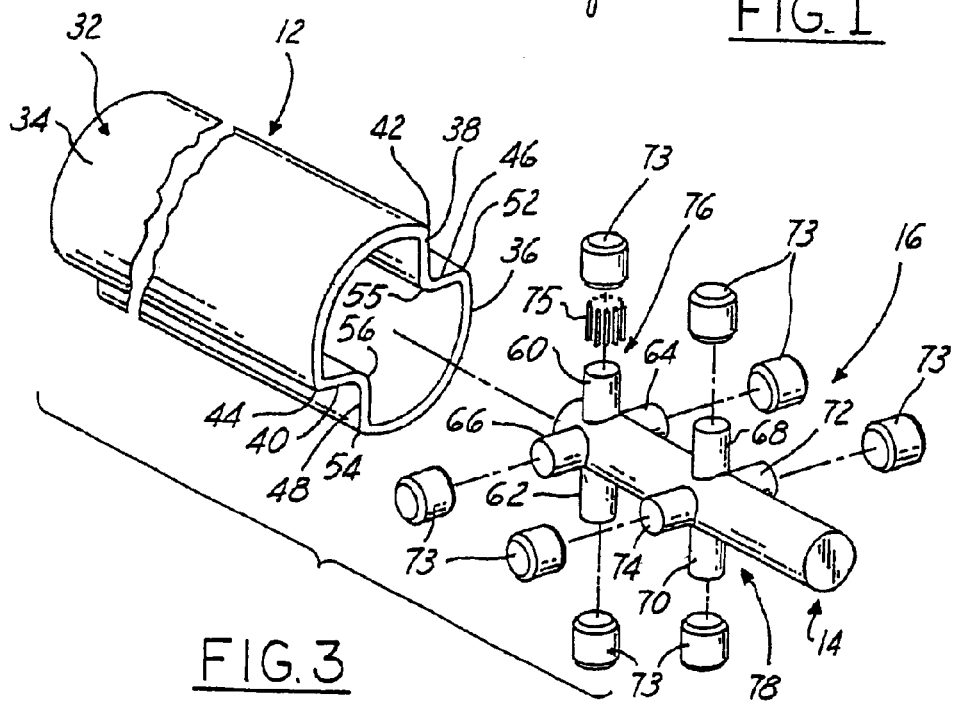
FIG. 3 is an exploded view of the shaft assembly.

Referring further to FIG. 2, and also to FIGS. 3–5, the outer shaft 12 is of uniform cross-section throughout its length and has an outer peripheral wall 32 including confronting, laterally spaced apart, axially extending arcuate wall sections 34 and 36. The wall sections 34 and 36 are directly opposite one another and are of the same circumferential extent.

Flat wall segments 38 and 40 extend radially inwardly from the longitudinal edges 42 and 44 of the wall section 34. Flat wall segments 46 and 48 extend radially inwardly from the longitudinal edges 52 and 54 of the wall section 36. The wall segments 38, 40, 46 and 48 provide roller tracks.

The wall segments 38 and 46 are at right angles to one another and at their closely adjacent radially inner extremities are joined by a narrow connecting bridge 55. The wall segments 40 and 48 are at right angles to one another and at their closely adjacent radially inner extremities are joined by a narrow connecting bridge 56.

The wall sections, wall segments and connecting bridges are preferably all integral parts of the outer shaft and extend the full length thereof.

The slip joint 16 includes a plurality of cylindrical pins 60, 62, 64, 66, 68, 70, 72 and 74 extending radially outwardly from the shaft 14, with a roller 73 mounted for rotation on each pin by needle bearings 75.

The pins are preferably arranged in pairs with the pins of each pair projecting radially outwardly from the inner shaft 14 in opposite directions on a common center line. There are a first pair of pins 60, 62, a second pair of pins 64, 66, a third pair of pins 68, 70 and a fourth pair of pins 72, 74. In the embodiment of FIGS. 2–5, the center line of the pair of pins 60, 62 and the center line of the pair of pins 64, 66 are perpendicular to one another and arranged so that the pins 60–66 are in a group 76 forming a cross in a common transverse plane. The center line of the pair of pins 68, 70 and the center line of the pair of pins 72, 74 are perpendicular to one another and arranged so that the pins 68–74 are in a group 78 forming a cross in a common transverse plane spaced axially from the plane of the group 76 of pins 60–66.

It will be noted that the pair of pins 60, 62 and the pair of pins 68, 70 are parallel and disposed in a first axial plane extending lengthwise of the shaft 14, and the pair of pins 64, 66 and the pair of pins 72, 74 are parallel and disposed in a second axial plane extending lengthwise of the shaft perpendicular to the first axial plane.

It should be understood that additional groups of four pins in crossing relation may be provided in axially spaced apart relation along the length of the inner shaft 14, as considered necessary or desirable.

The pins 60, 68 are adjacent to the track 38, the pins 64, 72 are adjacent to the track 46, the pins 62, 70 are adjacent to the track 48, and the pins 66, 74 are adjacent to the track 40. The rollers 73 on the pins roll on the adjacent tracks.

Referring to FIGS. 6 and 7, a modification is shown in which an inner shaft 79 has four pairs of pins, and again the pins of each pair project radially outwardly from the inner shaft 79 in opposite directions on the same center line. The inner shaft 79 itself is like the inner shaft 14 of the first embodiment. The pins 80–94 are like the pins 60–74 of the first embodiment although distributed along the inner shaft differently, and rollers, not shown, but like the rollers 73 of the first embodiment, will be and mounted for rotation on the pins by similar needle bearings. There are a first pair of pins 80, 82, a second pair of pins 84, 86, a third pair of pins 88, 90 and a fourth pair of pins 92, 94. Each pair of pins is spaced axially from the other pairs. The center lines of the alternate pairs of pins 80, 82 and 88, 90 are parallel to one another, and the center lines of the remaining pins 84, 86 and 92, 94 are parallel to one another but turned 90° to the pins 80, 82, 88 and 90 so as to be perpendicular thereto. Note also that the pins 80, 82 and the pins 88, 90 are disposed in a first axial plane extending lengthwise of the shaft 79, and the pins 84, 86 and the pins 92, 94 are disposed in a second axial plane extending lengthwise of the shaft 79 perpendicular to the first axial plane. Additional pairs of pins may be provided in axially spaced apart relation along the length of the shaft 79, as may be considered necessary or desirable. The inner shaft 79 is axially slidable in the previously described outer shaft 12 with its rollers engaging the tracks 38, 40, 46 and 48 in the same manner as in the first embodiment, and the assembled inner shaft 79 and outer shaft 12 may also be used as in intermediate shaft with a steering column as in FIG. 1. An end view of the inner shaft 79 in the outer shaft 12 would look exactly like the end view of the inner shaft 14 in the outer shaft 12 shown in FIG. 4.

The inner shaft 14 together with the pins projecting outwardly therefrom may, if desired, be formed as a single forging.

What is claimed is:

1. A slip shaft assembly for use with a steering column, comprising:

an elongated tubular outer shaft;

an elongated inner shaft extending lengthwise within said outer shaft; and a slip joint coupling said inner and outer shafts and operative to transmit torque in opposite directions between said shafts and to enable relative axial movement between said shafts, said slip joint including a plurality of rollers mounted on said inner shaft for rotation about respective roller axes transverse to a longitudinal axis of said inner shaft, wherein at least some of said plurality of rollers are spaced axially along said inner shaft relative to others of said plurality of rollers said slip joint including a single roller track surface associated with each of said rollers on said outer shaft and engaging and rollably supporting each associated roller on only one side thereof during transmission of said torque in said opposite directions, wherein said plurality of rollers includes a plurality of diametrically opposed pairs of said rollers, wherein at least one set of said plurality of roller pairs is spaced axially from at least one other set of said plurality of roller pairs, and wherein there are four of said sets of said roller pairs.

2. The assembly of claim 1 wherein two of said sets of roller pairs lie in a first common plane, and wherein the two remaining set of roller pairs lie in a second common plane that is spaced axially form the first common plane.

3. The assembly of claim 1 wherein each of said four sets of roller pairs lies in an associated plane and wherein each plane is spaced axially from the other planes.

* * * * *